(12) United States Patent
Backström

(10) Patent No.: US 10,917,585 B2
(45) Date of Patent: Feb. 9, 2021

(54) METHOD AND SYSTEM FOR FACILITATING TRANSPORTATION OF AN OBSERVER IN A VEHICLE

(71) Applicant: BAE SYSTEMS HÄGGLUNDS AKTIEBOLAG, Örnsköldsvik (SE)

(72) Inventor: Ronny Backström, Umeå (SE)

(73) Assignee: BAE SYSTEMS HÄGGLUNDS AKTIEBOLAG, Örnsköldsvik (SE)

( * ) Notice: Subject to any disclaimer, the term of this patent is extended or adjusted under 35 U.S.C. 154(b) by 0 days.

(21) Appl. No.: 16/300,032

(22) PCT Filed: May 10, 2017

(86) PCT No.: PCT/SE2017/050470
§ 371 (c)(1),
(2) Date: Nov. 8, 2018

(87) PCT Pub. No.: WO2017/196241
PCT Pub. Date: Nov. 16, 2017

(65) Prior Publication Data
US 2019/0149748 A1 May 16, 2019

(30) Foreign Application Priority Data
May 10, 2016 (SE) ........................ 1650625

(51) Int. Cl.
*H04N 5/262* (2006.01)
*H04N 7/18* (2006.01)
(Continued)

(52) U.S. Cl.
CPC ........... *H04N 5/2628* (2013.01); *F41H 5/266* (2013.01); *G02B 27/0093* (2013.01);
(Continued)

(58) Field of Classification Search
None
See application file for complete search history.

(56) References Cited

U.S. PATENT DOCUMENTS

| | | | |
|---|---|---|---|
| 3,720,131 A * | 3/1973 | Frohock, Jr. | F41G 3/32 89/41.03 |
| 6,271,875 B1 * | 8/2001 | Shimizu | G06F 3/011 348/169 |

(Continued)

FOREIGN PATENT DOCUMENTS

| | | |
|---|---|---|
| SE | 1451335 A1 | 5/2016 |
| WO | 2014/155072 A2 | 10/2014 |

OTHER PUBLICATIONS

Michael Abrash, Latency—the sine qua non of AR and VR, http://blogs.valvesoftware.com/abrash/latency-the-sine-qua-non-of-ar-and-vd/) (Year: 2012).*

(Continued)

*Primary Examiner* — Xiaolan Xu
(74) *Attorney, Agent, or Firm* — Morrison & Foerster LLP

(57) ABSTRACT

Systems and methods for facilitating transportation of an observer in a vehicle include providing video images of an environment of the vehicle from a plurality of cameras having partly overlapping field of views, detecting an orientation of the observer's head, combining the video images to provide a first video image of a first section of the environment of the vehicle, and presenting a second video image of a second section of the environment of the vehicle. The second section is a subset of the first section and corresponds to the detected orientation of the observer's head. The first section is a proper subset of the environment seen by the plurality of cameras. The detecting and present- (Continued)

ing are repeated after a predetermined time-period that is short enough not to cause nausea for the observer.

17 Claims, 3 Drawing Sheets

(51) Int. Cl.
| | |
|---|---|
| *F41H 5/26* | (2006.01) |
| *G02B 27/01* | (2006.01) |
| *G06T 3/40* | (2006.01) |
| *G02B 27/00* | (2006.01) |
| *H04N 5/247* | (2006.01) |
| *H04N 5/272* | (2006.01) |

(52) U.S. Cl.
CPC ............... *G02B 27/01* (2013.01); *G06T 3/40* (2013.01); *G06T 3/4038* (2013.01); *H04N 5/247* (2013.01); *H04N 5/272* (2013.01); *H04N 7/18* (2013.01); *H04N 7/181* (2013.01); *G02B 2027/0187* (2013.01)

(56) References Cited

U.S. PATENT DOCUMENTS

| | | | |
|---|---|---|---|
| 2002/0036649 A1 | 3/2002 | Kim et al. | |
| 2007/0097206 A1* | 5/2007 | Houvener | G03B 35/08 |
| | | | 348/26 |
| 2009/0195652 A1 | 8/2009 | Gal | |
| 2014/0087867 A1 | 3/2014 | Hightower | |
| 2016/0012855 A1* | 1/2016 | Krishnan | G11B 27/105 |
| | | | 386/241 |
| 2016/0110919 A1 | 4/2016 | Hancock et al. | |
| 2016/0246061 A1* | 8/2016 | Bickerstaff | G06F 3/012 |
| 2017/0287219 A1* | 10/2017 | Poulos | G02B 27/0172 |
| 2017/0310936 A1 | 10/2017 | Nordin | |

OTHER PUBLICATIONS

Abrash, Michael, "Latency—The Sine Qua Non of AR and VR", Ramblings in Valve Time, Available Online at <http://blogs.valvesoftware.com/abrash/latency-the-sine-qua-non-of-ar-and-vr/>, Dec. 29, 2012, 10 pages.

International Search Report and Written Opinion received for PCT Patent Application No. PCT/SE2017/050470, dated Aug. 1, 2017, 14 pages.

Office Action received for Swedish Patent Application No. 1650625-5, dated Dec. 14, 2016, 10 pages.

Office Action received for Swedish Patent Application No. 1650625-5, dated Aug. 1, 2017, 4 pages.

Extended European Search Report received for European Patent Application No. 17796493.9, dated Nov. 28, 2019, 8 pages.

* cited by examiner

METHOD AND SYSTEM FOR FACILITATING TRANSPORTATION OF AN OBSERVER IN A VEHICLE

CROSS REFERENCE TO RELATED APPLICATIONS

This application is a U.S. National Phase patent application of PCT/SE2017/050470, filed May 10, 2017, which claims priority to Swedish Patent Application No. SE 1650625-5, filed May 10, 2016, the disclosures of which are incorporated herein by reference in their entirety.

TECHNICAL FIELD

The present disclosure relates to a method and a system for facilitating transportation of an observer in a vehicle. The present disclosure further relates to a computer program and a computer program product.

BACKGROUND ART

A kind of optimising protection in a military vehicle is to cover the whole volume where passengers are transported by protective materials. These protective materials are in general not transparent, so that persons inside the vehicle cannot see the outside of the vehicle and thus its environment. This problem has in the past often been solved by periscope-like arrangements, but a modern solution is to put video cameras at the outside of the vehicle and to present the images from the video cameras to the driver or any other passenger in the vehicle. This presentation is in a prominent prior art solution performed by a so-called head-mounted display, HMD.

HMD or similar arrangements can, however, also be used in non-military vehicles or even in vehicles with windows or the like. An important part of such arrangements is that the picture which is presented to a passenger, in the following called observer, is in line with the direction of the head of the observer. In other words, when the observer turns his head, the picture should follow that turning so that the observer always sees a picture in the same direction as he would see when a window is present.

Such systems which are able to detect the orientation of the head of an observer and adapt the picture to it have one drawback. If they are built out of standard components, the reaction time between a turning of the head and the adaption of the video image to that turning is not fast enough. As a result, one or both eyes of the observer will get optical impressions which are slightly delayed compared to what the rest of the body of the observer will receive as input to its sense of balance. This delay is also called latency. Having this slight delay for some time will cause nausea by the observer, for example since the brain realizes that several inputs to the senses are not fully synchronised. The time when nausea starts can vary from person to person, but having nausea might deteriorate the operability of the observer.

So far, this problem is solved by not using standard components but instead developing high-performing components especially designed for the purpose of minimising delay time. Especially high computational power is usually needed for this purpose. This, however, adds heavily to system costs and complexity and leads to the fact that HMD or similar arrangements nowadays have a comparably low market share for the above discussed purpose.

There is thus a need for less complex and costly systems which still prevent nausea.

SUMMARY OF THE INVENTION

It is an object of the present invention to provide a less complex and costly system, method, computer program, and computer program product for preventing nausea when transporting an observer in a vehicle.

It is an object of the present invention to provide an alternative system, method, computer program, and computer program product for preventing nausea when transporting an observer in a vehicle.

At least some of the objects are achieved by a method for facilitating transportation of an observer in a vehicle. The method comprises the step of providing video images from a plurality of cameras. The cameras are oriented in such a way that the video images show parts of the environment of the vehicle in which the observer is transported. The field of views of the cameras are partly overlapping. The method further comprises the steps of detecting an orientation of the head of the observer and combining the video images so that the combined video images provide a first video image of a first section of the environment of the vehicle. The method even further comprises the step of presenting a second video image showing a second section of the environment of the vehicle to the observer. The second section is a subset of the first section. The second section of the environment corresponds to the detected orientation of the head of the observer. The first section of the environment is a proper subset of the environment which can be seen by the plurality of cameras such that the detecting and presenting is repeated after a predetermined time-period short enough not to cause nausea for the observer.

By using a proper subset of the environment and thus not the whole environment which can be seen by the cameras, a reduction in computation time can be achieved. This reduction allows keeping time periods for not causing nausea even with cheaper and less complex components.

In one example, the method further comprises the step of combining the video images so that the combined video images provide a third video image of a third section of the environment of the vehicle. The third section of the environment is a proper subset of the environment which can be seen by the plurality of cameras. One of the first section and the third section of the environment is a proper subset of the other. The one of the first section and the third section of the environment which is a proper subset of the other has a higher quality in the corresponding video image compared to the video image corresponding to the one of the first section and the third section of the environment which is a superset of the other. This has the advantage that computation time can be lowered even further.

In one example, the repeating of the detecting and the presenting after a predetermined time-period short enough not to cause nausea for the observer is done at least every 17 milliseconds, preferably at least every 14 milliseconds, and even more preferably at least every 12 or every 10 milliseconds. This assures not introducing too much delay in steps of the method so that nausea can occur by an observer.

In one example of the method the horizontal and/or vertical angle of view of the first and/or the possible third section is lower than 120 degrees, preferably lower than 90 degrees. This assures a substantial reduction in computation time without influencing in a negative way to the performance when presenting video images to an observer. The above wording can include the case that one of the horizontal and vertical angle of view is lower than 120 degrees, whereas the other one is lower than 90 degrees.

In one example the frame rate of the video images from the plurality of cameras is at least 25 Hertz. This assures that the video images are not perceived as a slide show of standing-still images by the observer.

In one example the presenting is performed by presenting means which follow the movement of the head of the observer. This assures in an easy way that the presenting will follow the orientation of the head of the observer.

In one example the method further comprises the step of adding virtual objects to the second video image. This allows using the disclosure in connection with augmented reality.

In one example the method further comprises the step of adding overlay information to said second video image. This provides an especially useful method when operating the vehicle.

At least some of the objects are also achieved by a system for facilitating transportation of an observer in a vehicle. The system comprises a plurality of cameras being arranged to provide video images. The cameras are oriented in such a way that the video images show parts of the environment of the vehicle in which the observer is transported. The field of views of the cameras are partly overlapping. The system further comprises means for combining the video images so that the combined video images provide a first video image of a first section of the environment of the vehicle. The system even further comprises means for detecting an orientation of the head of the observer. The system also comprises means for presenting a second video image showing a second section of the environment of the vehicle to the observer. The second section is a subset of the first section. The second section of the environment corresponds to the detected orientation of the head of the observer. The first section of the environment is a proper subset of the environment which can be seen by said plurality of cameras such that the means for detecting and the means for presenting are arranged to repeat the detecting and the presenting, respectively, after a predetermined time-period short enough not to cause nausea for the observer.

In one embodiment, the system further comprises means for combining the video images so that the combined video images provide a third video image of a third section of the environment of the vehicle. The third section of the environment is a proper subset of the environment which can be seen by the plurality of cameras. One of the first section and the third section of the environment is a proper subset of the other. The one of the first section and the third section of the environment which is a proper subset of the other has a higher quality in the corresponding video image compared to the video image corresponding to the one of the first section and the third section of the environment which is a superset of the other.

In one embodiment the means for detecting and the means for presenting are arranged to repeat the detecting and the presenting, respectively, at least every 17 milliseconds, preferably at least every 14 milliseconds, and even more preferably at least every 12 or every 10 milliseconds.

In one embodiment of the system, the horizontal and/or vertical angle of view of the first and/or the possible third section is lower than 120 degrees, preferably lower than 90 degrees.

In one embodiment, the frame rate of the video images from said plurality of cameras is at least 25 Hertz.

In one embodiment the means for presenting are arranged to follow the movement of the head of the observer.

In one embodiment the system further comprises means for adding virtual objects to the second video image.

In one embodiment the system further comprises means for adding overlay information to the second video image.

At least some of the objects are also achieved by a computer program for facilitating transportation of an observer in a vehicle. The computer program comprises program code for causing an electronic control unit or a computer connected to the electronic control unit to perform the steps according to the method of the present disclosure.

At least some of the objects are also achieved by a computer program product containing a program code stored on a computer-readable medium for performing method steps according to the method of the present disclosure, when the computer program is run on an electronic control unit or a computer connected to the electronic control unit.

The system, the vehicle, the computer program and the computer program product have corresponding advantages as have been described in connection with the corresponding examples of the method according to this disclosure.

Further advantages of the present invention are described in the following detailed description and/or will arise to a person skilled in the art when performing the invention.

BRIEF DESCRIPTION OF THE DRAWINGS

For a more detailed understanding of the present invention and its objects and advantages, reference is made to the following detailed description which should be read together with the accompanying drawings. Same reference numbers refer to same components in the different figures. In the following.

DETAILED DESCRIPTION

Here, and in the whole document, when relating to degrees, it is assumed that a full circle has 360 degrees.

The term "link" refers herein to a communication link which may be a physical connection such as an opto-electronic communication line, or a non-physical connection such as a wireless connection, e.g. a radio link or microwave link.

Figure 1:
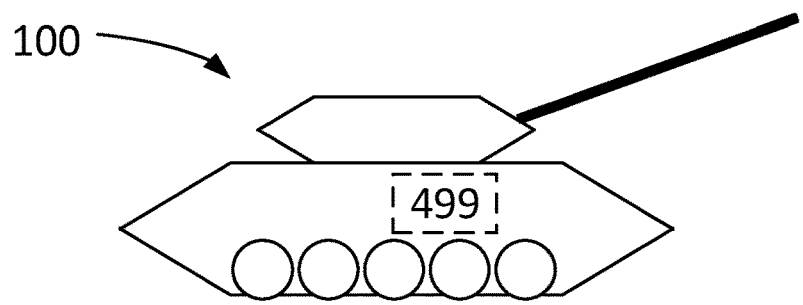
FIG. 1 depicts a schematic example of a vehicle which can be used in connection to the present disclosure.

FIG. 1 depicts a schematic example of a vehicle 100 which can be used in connection to the present disclosure. The depicted vehicle 100 is a military vehicle such as a tracked vehicle. The vehicle can, however, even be a non-military vehicle. The depicted vehicle 100 is a land-borne vehicle. The present disclosure can, however, also be used in connection with air-borne vehicles, or water-borne vehicles.

The kind of vehicle is in principle of no importance, as long as it can transport an observer. When transporting the observer, the vehicle will eventually expose the observer to forces. The forces can cause the observer to accelerate into one or several directions. The body of the observer will thus be eventually accelerated. When referring to acceleration, this can be positive or negative acceleration. The acceleration of the body of the observer can be due to acceleration or deceleration of the vehicle, due to cornering, rolling, turning, or the like of the vehicle. As an example, when driving on a road with slopes, the body might experience some acceleration, especially if the slope changes.

The vehicle can be equipped with a system 499 according to the present disclosure.

Figure 2A:
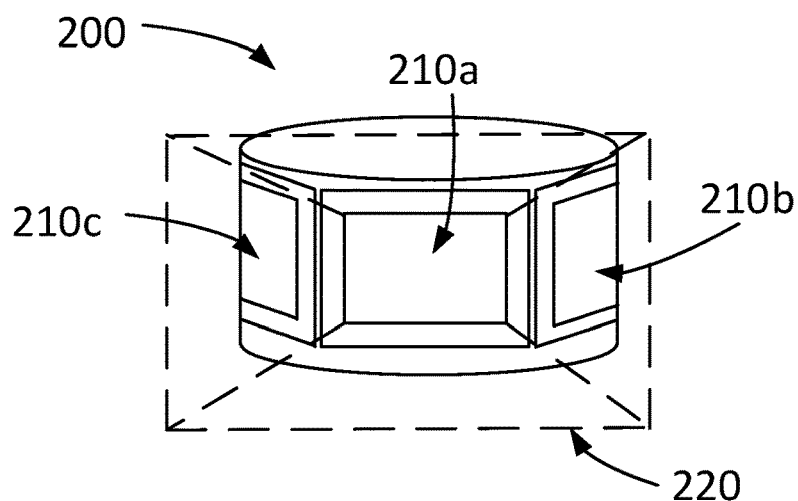
FIG. 2a depicts a schematic example of a plurality of cameras.

FIG. 2a depicts a schematic example of a plurality of cameras. An arrangement 200 is shown. The arrangement 200 comprises the plurality of cameras. In the shown example, three cameras 210a, 210b, 210c are depicted. The number of cameras in the arrangement 200 is arbitrary. Said cameras are video cameras, i.e. they are arranged to repeatedly take images. Preferably the rate at which the images are taken, the so-called frame-rate, is at least 25 Hertz. Showing the taken images at a rate of at least 25 Hertz allows then for the eyes of an observer not to realise that single images are taken after each other.

In a preferred embodiment, the cameras are arranged so that a so-called 360 degree-view can be achieved when combining the images from the cameras. Often more than the depicted three cameras are used for achieving this. Assuming a land-borne vehicle standing on level ground the 360 degree-view can correspond to see in the front and in the rear direction of the vehicle, as well as seeing to the left and to the right direction of the vehicle. In other words, a 360 degree-view will allow always having a view when turning in a full circle around a central point.

Each camera of the plurality of cameras has its field of view. The field of view 220 of camera 210a is depicted by the dashed lines in the figure. The field of views of the cameras are partly overlapping. In the shown example, the field of view 220 of camera 210a is partly overlapping with the field of view of camera 210c (not shown in the figure), and the field of view of camera 210b (not shown in the figure). This partial overlapping assures that parts of the pictures which the cameras are taking are overlapping. This overlapping of the pictures will then allow combining the pictures from several cameras so as to achieve a combined picture from these cameras. This is well known in the art.

In one example, the arrangement 200 is attached to the vehicle 100. In one example, the arrangement 200 is on top of the vehicle, for example such as an extra tower on top of the vehicle. In one example, the plurality of cameras is distributed around the sides of the vehicle. In one example the cameras are distributed on a turret of the vehicle. The cameras are arranged to take images from the environment of the vehicle.

Figure 2B:
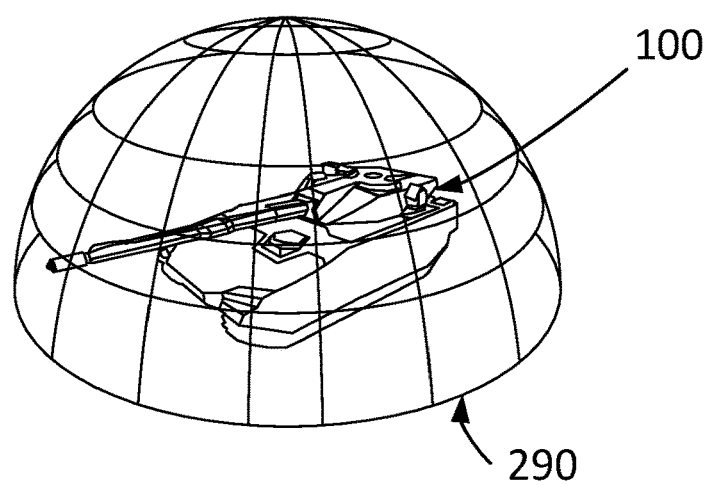
FIG. 2b depicts a schematic situation in which the present disclosure can be used.

In one example, the cameras in the plurality of cameras are arranged to take images so that approximately a sphere or a half-sphere is covered. This situation is illustrated in FIG. 2b where a half-sphere 290 is illustrated. The shown half-sphere is the half-sphere above the ground. The cameras can also be arranged to take images in a full sphere. This might be especially useful for airborne vehicles and/or for vehicles operating in water.

Figure 3:
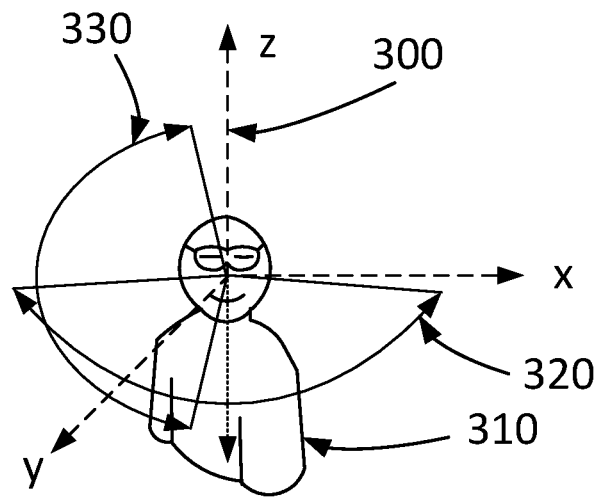
FIG. 3 depicts a schematic example of an observer.

FIG. 3 depicts a schematic example of an observer 310. A coordinate system 300 is illustrated with its x-, y-, and z-axis in dashed lines. The observer has his head oriented so that his face points in the direction of the dotted arrow. In the shown example, the dotted arrow lies completely in the x-y-plane, i.e. its z-component is zero. From the shown orientation of the head, the observer will be able to turn his head. During a given time period, the observer will be able to turn his head at maximum around a certain angle. In the shown example, a first angle 320 and a second angle 330 are illustrated by arrows and full lines. The first angle 320 depicts how the observer can turn his head to the left and to the right during a given time period. In the shown example such a turning would not change the z-component of the orientation of the head. The second angle 330 depicts how the observer can turn his head in the up- and down-direction. The first and second angles 320, 330 do not need to be equal in size. In a more general solution different angles can be determined for a left-turning, a right-turning, an up-turning, and a down-turning of the head. In general, the angles for left- and right-turning are different, but this is not a prerequisite. The first angle 320 can also be denoted horizontal angle. The second angle 330 can also be denoted vertical angle.

Figure 4:
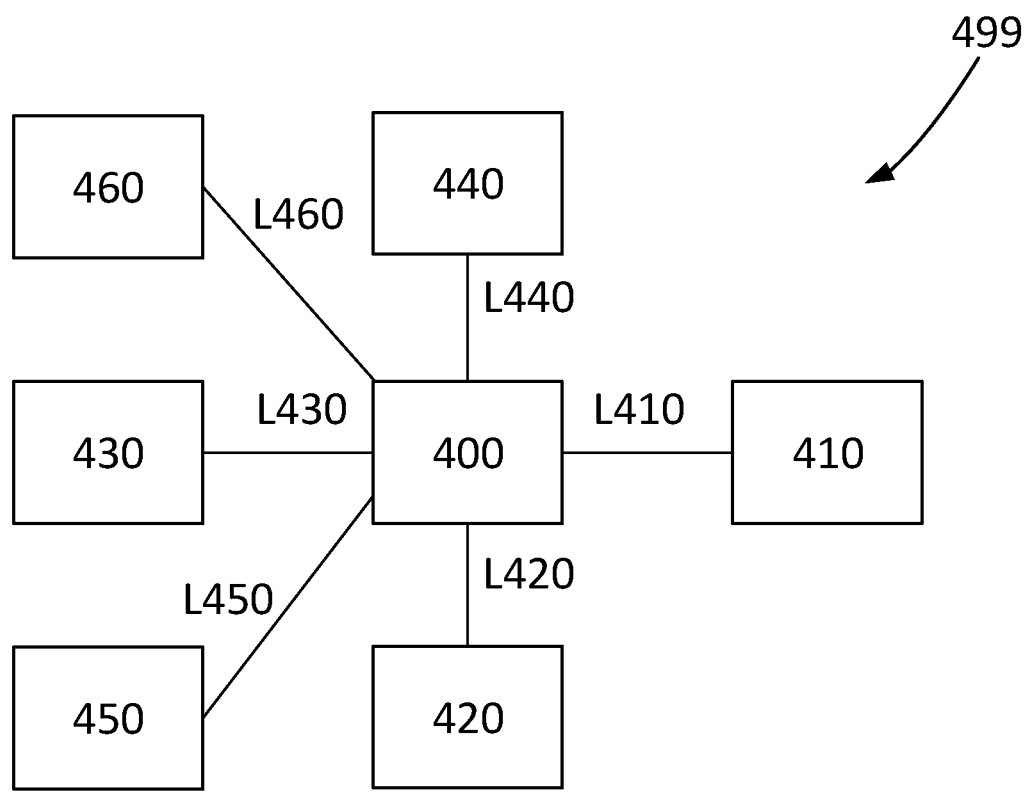
FIG. 4 depicts a schematic example of a system according to the present disclosure.

FIG. 4 depicts a schematic example of a system 499 according to the present disclosure. The system 499 comprises a plurality of cameras 410. Said plurality of cameras 410 can be comprised in the arrangement 200. The plurality of cameras 410 are arranged to provide video images. The cameras in the plurality of cameras 410 are oriented in such a way that the video images show parts of the environment of the vehicle in which the observer is transported. The field of views of the cameras in the plurality of cameras 410 are partly overlapping. Further details of the cameras in the plurality of cameras 410 are described in relation to FIG. 2a and FIG. 2b.

The system 499 comprises means 420 for detecting an orientation of the head of the observer. The term orientation of the head does in one example relate to the pointing direction of the face. Said means comprise in one example a gyroscope. Said means comprise in one example optical means. Said orientation of the head of the observer can be a two-dimensional or a three-dimensional orientation. In one example, the two-dimensional orientation relates to an orientation of the head in the x-y-plane as depicted in FIG. 3. This might especially useful if the plurality of cameras is arranged to provide a circular view. A three-dimensional orientation is preferably detected if the provided views show a half-sphere, a full sphere, or any other sphere section which is not purely circular. Said means 420 for detecting an orientation of the head of the observer might be integrated together with means 430 for presenting a second video image. This is especially useful, if said means 430 for presenting a second video image are head worn. In that case a compact system can be achieved.

Said means 420 for detecting an orientation of the head of the observer are arranged to repeat said detecting after a predetermined time-period short enough not to cause nausea for the observer. In one example, the means 420 for detecting an orientation of the head of the observer are arranged to detect the orientation at least every 17 milliseconds, preferably at least every 14 milliseconds, and even more preferably at least every 12 or every 10 milliseconds. Nausea can be avoided if the latency is kept below a certain time-period. This time-period can vary between different persons, but a latency below 10 milliseconds usually avoids nausea for any person. Above 17 milliseconds, nausea is in general not avoided for any person. The lower the time-period in the range 17-10 millimeter, the less persons will observe nausea due to the latency.

The system 499 comprises a first control unit 400. Said first control unit 400 is arranged to control operation of said plurality of cameras 410. Said first control unit 400 is arranged for communication with said plurality of cameras 410 via a link L410. Said first control unit 400 is arranged to receive information from said plurality of camera 410.

The first control unit is arranged for combining the video images which have been provided by the plurality of cameras 410, so that the combined video images provide a first video image of a first section of the environment of the vehicle. This is further described in relation to FIG. 5. Said first section of the environment is a proper subset of the environment which can be seen by said plurality of cameras. The term proper subset relates to the mathematical meaning of the wordings. In other words, the first section of the environment corresponds to a part of the environment which is contained in the environment which can be seen by the plurality of cameras, but which is smaller than the environment which can be seen by the plurality of cameras.

Said first control unit 400 is arranged to control operation of said means 420 for detecting an orientation of the head of the observer. Said first control unit 400 is arranged for communication with said means 420 for detecting an orientation of the head of the observer via a link L420. Said first control unit 400 is arranged to receive information from said means 420 for detecting an orientation of the head of the observer.

Said first control unit 400 is further arranged to determine a second section of the environment of the vehicle. Said second section is a subset of said first section. Said second section of the environment corresponds to the detected orientation of the head of the observer. In one example, the centre of said second section corresponds to the pointing direction of the face of the observer. Said control unit 400 is arranged to extract a second video image, corresponding to the second section.

The system 499 comprises means 430 for presenting the second video image to the observer. Said first control unit 400 is arranged to control operation of said means 430 for presenting the second video image to the observer. Said first control unit 400 is arranged for communication with said means 430 for presenting the second video image to the observer via a link L430.

Said means 430 for presenting the second video image are arranged to repeat said presenting after a predetermined time-period short enough not to cause nausea for the observer. In one example, said means 430 for presenting the second video image are arranged to detect the orientation at least every 17 milliseconds, preferably at least every 14 milliseconds, and even more preferably at least every 12 or every 10 milliseconds.

Said means 430 for presenting the second video image are in one example arranged to follow the movement of the head of the observer. Said means 430 for presenting the second video image can comprise goggles. In one example, the goggles are arranged to present the second video image in front of one or both eyes. In one example, said means 430 for presenting the second video image comprise a display or a projector in front of at least one eye of the observer. Said means 430 comprise in one example a head mounted display, HMD.

The first control unit 400 is in one example arranged to combine said video images so that the combined video images provide a third video image of a third section of the environment of the vehicle. Said third section of the environment is a proper subset of the environment which can be seen by said plurality of cameras 410. One of said first section and said third section of the environment is a proper subset of the other. The one of said first section and said third section of the environment which is a proper subset of the other has a higher quality in the corresponding video image compared to the video image corresponding to the one of said first section and said third section of the environment which is a superset of the other. The term quality refers in one example to resolution. A higher quality can comprise a higher resolution. The term quality refers in one example to colour depth. A higher quality can comprise a higher colour depth. The term quality refers in one example to a degree of compression. A higher quality can comprise lower degree of compression. In the following description, the term resolution will be used as an example of quality. It should, however, be noted that equally well colour depth, degree of compression, other quality defining parameters, or any combination thereof could be used.

The first control unit 400 is in one example arranged for adding virtual objects to said second video image. Said virtual objects can relate to what is commonly known as augmented reality. Said virtual objects can be geo-referenced. This adding of virtual objects depends in one example of the visibility of the objects, for example whether they are or become partly visible or fully visible. This is described in further detail later on.

The first control unit 400 is in one example arranged for adding overlay information to said second video image. Such overlay information can, for example, be any of vehicle speed, coordinates or orientation of the vehicle, information regarding status of the vehicle, time, or the like. Said overlay information is generally not geo-referenced.

The horizontal and/or vertical angle of view of the first and/or the possible third subset is in one example lower than 120 degrees, preferably lower than 90 degrees. Thus, only a limited set of all the images from the plurality of cameras has to be combined. Assuming that both the horizontal and the vertical angle are 90 degrees, this corresponds to one eighth of a full sphere. Since computation time for combining images usually scales at least quadratically with the images size, this can give a saving in computational time of at least one over sixty-four, thus drastically lowering the computation time. A lowering of the computation time will in its turn allow lowering delays in the system, thus allowing keeping time-limits for not causing nausea even with standard components.

In one example, the system 499 comprises means 450 for determining the position and/or orientation of the vehicle. Said means 450 for determining the position and/or orientation of the vehicle is in one example a navigation system of the vehicle. Said means 450 for determining the position and/or orientation of the vehicle can comprise a connection to a global navigation satellite system, GNSS, such as the global positioning system, GPS. Said means 450 for determining the position and/or orientation of the vehicle can comprise one or more gyroscopes. Said means 450 for determining the position and/or orientation of the vehicle are arranged to determine the position and/or orientation of the vehicle.

The first control unit 400 is arranged to control operation of said means 450 for determining the position and/or orientation of the vehicle. Said first control unit 400 is arranged for communication with said means 450 for determining the position and/or orientation of the vehicle via a link L450.

In one example, the system 499 comprises means 460 for determining the orientation of a turret. Said means 460 for determining the orientation of a turret can comprise one or more gyroscopes. Said means 460 for determining the orientation of a turret are arranged for determining the orientation of a turret of the vehicle.

The first control unit 400 is arranged to control operation of said means 460 for determining the orientation of a turret.

Said first control unit 400 is arranged for communication with said means 460 for determining the orientation of a turret via a link L460.

Said means 450 and/or 460 can provide the first control 400 unit with information regarding the position and/or orientation of the vehicle, and/or the orientation of the turret, respectively. Said information can be used by the first control unit 400 for combining the video images, and/or for other steps performed by the first control unit 400.

The system 499 can comprise a second control unit 440. The second control unit 440 is arranged for communication with the first control unit 400 via a link L440 and may be detachably connected to it. It may be a control unit external to the vehicle 100. It may be adapted to conducting the innovative method steps according to the disclosure. The second control unit 440 may be arranged to perform the inventive method steps according to the disclosure. It may be used to cross-load software to the first control unit 400, particularly software for conducting the innovative method. It may alternatively be arranged for communication with the first control unit 400 via an internal network on board the vehicle. It may be adapted to performing substantially the same functions as the first control unit 400. The innovative method may be conducted by the first control unit 400 or the second control unit 440, or by both of them.

So far, the system 499 has been described for application to one observer. The system 499 can, however, equally be used to several observers. In that case several means 420 and 430 can be provided, one for each observer. There is, however, in general no need to increase the amount of the elements 400, 410, or 440, although this can be done as well. In one embodiment, the elements 400, 410, and/or 440 are the same for all observers.

Figure 5:
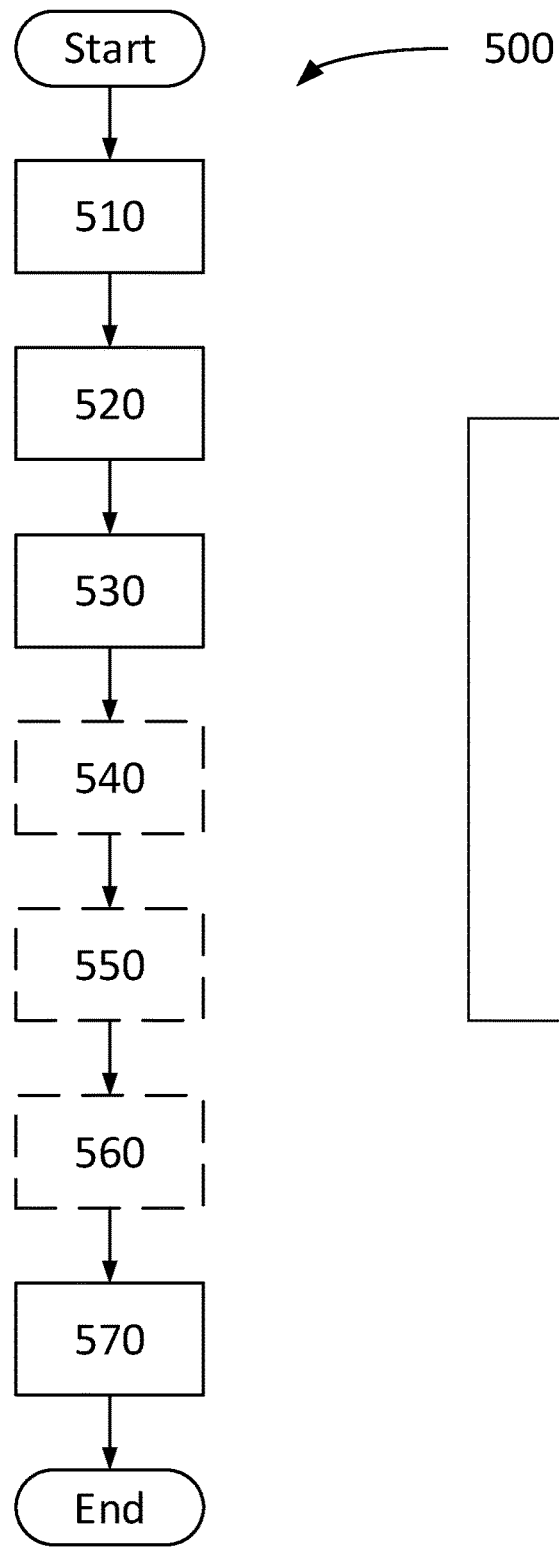
FIG. 5 depicts a schematic example of a method according to the present disclosure.

FIG. 5 depicts a schematic example of a method 500 for facilitating transportation of an observer in a vehicle. The method steps can be performed in another order than the order presented in the following. In principle, the method steps can be performed in any order, or in parallel. Performing steps in parallel might be especially useful for achieving low latency. The method starts with step 510.

In step 510 video images are provided from a plurality of cameras. The cameras are oriented in such a way that the video images show parts of the environment of the vehicle in which the observer is transported. The field of views of the cameras are partly overlapping. The field of views of the cameras are partly overlapping so that a combined image can be achieved. As an example, if cameras are oriented so that the images can be combined to form an image of a circle around the vehicle, it can be practical that the field of views of each camera overlaps at least with the field of views of its neighbouring cameras, for example to the left and to the right. When a full- or a half-sphere image should be provided later on in step 530, it is preferable that the field of view of a camera overlaps with the field of views of at least three or four other cameras. The video images preferably at least show the environment in the possible moving directions of the vehicle. Assuming a land-based vehicle, the video images show preferably at least the forward and/or the backwards direction of the vehicle. In a preferred embodiment, even the environment to the side of the vehicle is covered by video images. By this an observer will then have the possibility to get an image of the environment of the vehicle when turning his head by any angle to the left or the right. As described earlier, even the environment above and/or below the vehicle can be covered by the video images. In principle, any parts of the environment, or the whole environment can be covered by the cameras. Preferably, the frame rate of the video images from said plurality of cameras is at least 25 Hertz. The method continues with step 520.

In step 520 an orientation of the head of the observer is detected. By detecting the orientation of the head, it is possible to determine which part of the environment outside the vehicle the observer would see if he could see through the vehicle. It should be noted that the orientation of the head does not necessarily coincide with the viewing directions of the eyes of the observer. However, changing the viewing direction of the eyes will result in the eyes seeing another part of an image at the later step 570. It will preferably not result in seeing another image, as long as the orientation of the head does not change as well. This is due to the fact that the balance senses of the observer are sensitive to the orientation of the head and not to the orientation of the eyes. The detection is repeated after a predetermined time-period short enough not to cause nausea for the observer.

The detection of the orientation of the head is preferably performed at least every 17 milliseconds, preferably at least every 14 milliseconds, and even more preferably at least every 12 or every 10 milliseconds. Images presented to the observer in a later step have to be adapted fast enough to the orientation of the head of the observer to not cause nausea. For achieving a fast adaption it is therefore necessary that the detection is fast enough. The method continues with step 530.

In step 530 said video images are combined so that the combined video images provide a first video image of a first section of the environment of the vehicle. How to combine overlapping images to a combined image is well known in the art and therefore not discussed here any further. The first section of the environment is a proper subset of the environment which can be seen by the plurality of cameras. Since the first section of the environment is a proper subset of the environment seen by the plurality of cameras, it is not necessary to combine the images from all the cameras. Since computation time for combining images usually scales at least quadratically with the images size, this gives a substantial saving in computational time. A lowering of the computation time will in its turn allow lowering delays in the system, thus allowing keeping time-limits for not causing nausea even with standard components. The centre of the first section of the environment corresponds preferably to the orientation of the head, for example coincides with the pointing direction of the face of the observer. In one example, the horizontal and/or vertical angle of view of the first section is lower than 120 degrees, preferably lower than 90 degrees. In other words, the first section of the environment shows the environment in an angle of 60 degrees or 45 degrees, respectively, to the right/left and/or up/down of the centre of the first section. During a short pre-determined time period, an observer will not be possible to turn his head more than a pre-determined angle. As an example, it can be assumed that an observer will not be able to turn his head more than 60 degrees in any direction in less than 17 milliseconds. There is therefore no need to combine the images from the plurality of cameras to a combined image which is so large that the observer will be unable to see parts of it when turning his head during a short predetermined time-period. As an example, having a frame-rate of the cameras of 25 Hertz, new images will be provided every 40 milliseconds. It is thus not needed to combine the images to a section of the environment being bigger than the observer can turn its head during these 40 milliseconds. The method continues with the optional step 540. This optional step will be described later on. First, method step 570 will be described which is performed after step 530.

In step 570 a second video image is presented to the observer. The second video image does show a second section of the environment of the vehicle. The second section is a subset of the first section. Thus, a subset of the combined video image from step 530 is presented to the observer. The second section of the environment corresponds to the detected orientation of the head of the observer. This results in that the video images which are presented to the observer correspond to what the observer would see if he could see through the vehicle. The presenting is repeated after a predetermined time-period short enough not to cause nausea for the observer. In one example, the presenting is repeated at least every 17 milliseconds, preferably at least every 14 milliseconds, and even more preferably at least every 12 or every 10 milliseconds. Preferably, the presenting of the second video image is performed at a multiple of the frame rate of the cameras. Preferably, the presenting is repeated at the same frame rate or at a multiple frame rate of the detection of the head in step 520. Updating the video image at least every time a new orientation of the head is detected gives a short response to movements of the head of the observer. Thus, the visual impression presented to the eyes of the observer will follow the impression which the observer observes by its balance senses. It should be emphasized that it is not required that the frame-rate of the camera is as short as the detection rate of the head in step 520 or as the presentation rate in step 570. The important thing is that the section of the environment which is presented to the observer corresponds to the section of the environment which the observer would see through the vehicle. It does not matter that the image of the environment which is presented is tens of milliseconds "old", as long as it is shows the right section. Thus, in one example, the second video image when showing the second section of the environment of the vehicle to the observer, presents the second section of the environment from a moment of time which is more than 10, or more than 17 milliseconds earlier than the moment of presenting. The same can apply to the first and/or third video image, which in one example are more than 10, or more than 17 milliseconds "old" when having been combined.

In one example, the presenting is performed by presenting means which follow the movement of the head of the observer. Examples of such presenting means are goggles, HMD, or the like. After step 570 the method 500 ends.

It should be understood that, as indicated, the steps of the method are repeated in a practical application. It should also be understood, as discussed, that the steps of the method can be repeated on different time scales. As an example, the steps 520 and 570 can be repeated at a higher frequency than step 510, which in its turn can be repeated at a higher frequency than step 550 or step 560 which will be described soon.

In an optional step 550 virtual objects are added to the second video image. This is preferably done before presenting the second video image. Virtual objects relate in one example to what is commonly known as augmented reality. In one example the adding of virtual objects is done at the same rate as the repetition rate of the presenting. This has the advantage of an always up-to-date image. In one example the adding of virtual objects is done at a lower rate as the repetition rate of the presenting. Since it in general will not adverse the nausea negatively if the adding of the virtual objects is delayed, the lower rate can further limit the technical requirements needed for a system performing the method.

In one example, the updating rate of virtual objects is different for different kinds of virtual objects. In one example, virtual objects assuming to represent objects closer to the vehicle are updated more frequently than further distant objects. In one example, virtual objects assuming to represent objects closer to the line of sight of the observer are updated more frequently than objects further away from the line of sight. In one example, virtual objects which are basically fully visible are updated more frequently than objects which are partly hidden. In one example, virtual objects which are partly hidden are updated more frequently than objects which are totally hidden. In one example, virtual objects are rendered as they become partly visible, and thus still are partly hidden. This is in one example performed when a virtual object first was totally hidden and then becomes only partly hidden. The same applies to virtual objects which transform from being partly hidden to becoming basically fully visible. An object which is partly hidden is, for example, an object partly hidden behind trees, buildings, hills, or the like. A completely hidden object can be an object which is completely hidden behind trees, buildings, hills, or the like.

In an optional step 560 overlay information is added to the second video image. The type of overlay information has already been described before. It is enough to update the overlay information at a significantly lower rate than the rates of step 510, 520, 530, and/or 570. In one example the overlay information is updated four times a second. Since overlay information is generally always put on the same place in an image, the adding of this information is generally irrespective of the orientation of the head of the observer.

The updating rate in any of the previously described steps depends in one example on the speed of the vehicle. In one example, the faster the vehicle moves, the faster will be the updating rate. This is due to the fact that, in general, the surrounding for a standing still vehicle or a vehicle moving at low speed will not change as fast as for a fast moving vehicle. In one example, the method is only performed when the vehicle is moving.

In an optional step 540 the video images are combined so that the combined video images provide a third video image of a third section of the environment of the vehicle. This step is preferably performed before step 570. The third section of the environment is a proper subset of the environment which can be seen by said plurality of cameras.

One of the first section and the third section of the environment is a proper subset of the other. The one of the first section and said third section of the environment which is a proper subset of the other has a higher resolution in the corresponding video image compared to the video image corresponding to the one of the first section and the third section of the environment which is a superset of the other.

To illustrate the idea behind the step it is assumed that the third section is a proper subset of the first section and thus has a higher resolution. Since the third section is a proper subset of the first section it will show a smaller section of the environment than the first section. Having a smaller section will thus require less computation time for combining the images to the third video image since less images need to be used. However, since the resolution is higher, this will increase computation time. There is thus a trade-off between the size of the section and the resolution. As an example, video images for the third section could have the full resolution of the cameras, whereas video images for the first section could have half the resolution of the cameras. In this example, the second video image which is presented to the observer is then the video image with the lower resolution.

In one example, it is detected how fast the observer turns his head. If the turn rate is above a pre-determined threshold, the images with the lower resolution are presented. This corresponds to the above example. The idea behind is that a fast turning will result in the images of the environment presented to the observer will change quickly the parts of the environment presented to the observer. The observer will thus not be able to see small details and is thus not in immediate need of them. Hence, the observer will not realise that the images have a lower resolution due to the rapid change of the images. On the other hand, a fast turning rate might result in large angles of turning the head. It is therefore advantageous to lower the resolution and gain a large section of the environment from which images can be presented to the observer. As a result, the latency can be kept even lower.

If, on, the other hand, the turning of the head is detected to be below a pre-determined threshold, the role of the third and the first section in the example above are interchanged. Then a high-resolution picture will be presented to the observer. Since the turning rate is low the observer will actually be able to see smaller details. On the other hand, a low turning rate allows restricting to a low section of the environment, since a new camera image will be taken, before a substantial change of the environment which will be presented to the observer will take place. As before, this results in keeping the latency even lower.

In principle, the method could be changed so that what has been described in relation to the first and third section regarding subsections and resolution could be generalized to several intermediate resolutions and sizes of sections of the environment.

When referring to video images in this disclosure these video images do not necessarily have to be "real" video images. Instead, the video images can be virtual. As an example, when operating the vehicle during night or in a foggy or cloudy environment, a video image representing what would be seen by the eyes of the observer, i.e. using cameras recording visible light, might be disadvantageous. Instead, infrared cameras, or cameras at any other wavelengths can be used. The images of these cameras can be converted into a virtual video image. Thus a better orientation for an observer of the vehicle is provided even at problematic environmental conditions.

Figure 6:
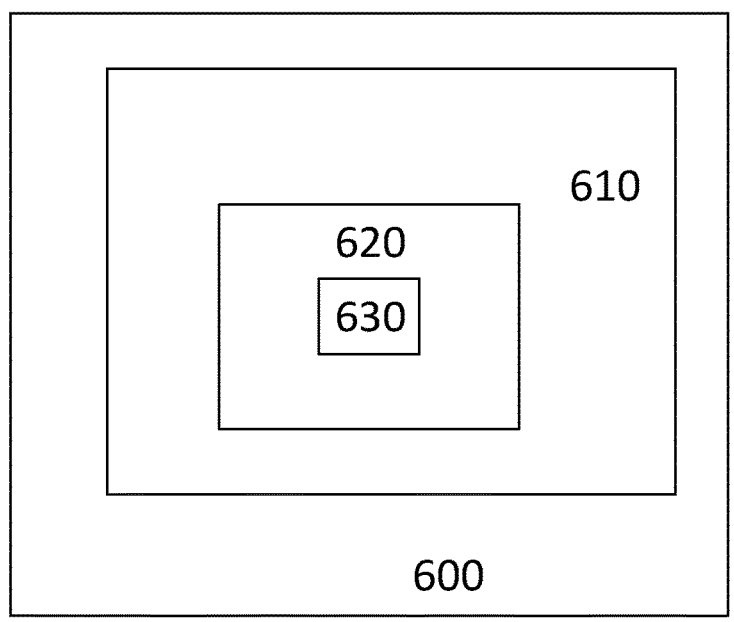
FIG. 6 depicts a schematic example of sections of the environment.

FIG. 6 depicts schematically some possible relations between the environment of the vehicle and sections thereof. This is done for providing a better understanding of the invention. Area 600 depicts schematically the whole environment of the vehicle. This is, for example, a projection of the surface of a full sphere surrounding the vehicle. Area 610 depicts schematically the part of the whole environment which can be observed by the plurality of cameras. The areas 600 can be equal in size, but in the shown example area 610 is smaller than area 610. Area 610 could for example represent a half sphere as indicated by FIG. 2b. In one example, area 610 represents a spherical zone. This has been referred to as turning in a full circle or forming a circle in the description.

Area 620 depicts schematically the first section. Area 620 is smaller than area 610. The first section represents thus the part of the environment for which the images from the cameras are combined. Area 630 depicts schematically the second section. Area 630 is smaller than area 620. A turning of the head of the observer will then move the second section, i.e. area 630. Since the second section is inside the first section, and since the images of the first section are combined, a limited move of the second section will only require to present another section of the first section as the new second section to the observer without the need of making a new combination of the images.

The foregoing description of the preferred embodiments of the present invention is provided for illustrative and descriptive purposes. It is neither intended to be exhaustive, nor to limit the invention to the variants described. Many modifications and variations will obviously suggest themselves to one skilled in the art. The embodiments have been chosen and described in order to best explain the principles of the invention and their practical applications and thereby make it possible for one skilled in the art to understand the invention for different embodiments and with the various modifications appropriate to the intended use.

The invention claimed is:

1. A method for facilitating transportation of an observer in a vehicle, the method comprising the steps of:
   providing video images from a plurality of cameras, wherein said cameras are oriented in such a way that the video images show parts of the environment of the vehicle in which the observer is transported and wherein the field of views of said cameras are partly overlapping;
   detecting an orientation of the head of the observer;
   combining said video images from the plurality of cameras so that the combined video images provide a first video image of a first section of the environment of the vehicle; and
   presenting a second video image showing a second section of the environment of the vehicle to the observer, wherein said second section is a subset of said first section and wherein said second section of the environment corresponds to the detected orientation of the head of the observer,
   wherein said first section of the environment is a proper subset of the environment which can be seen by said plurality of cameras such that said detecting and said presenting is repeated after a predetermined time-period short enough not to cause nausea for the observer,
   combining said video images from the plurality of cameras so that the combined video images provide a third video image of a third section of the environment of the vehicle,
   wherein said third section of the environment is a proper subset of the environment which can be seen by said plurality of cameras, wherein said third section of the environment is a proper subset of the first section and has a higher quality in the corresponding video image compared to the video image corresponding to the first section of the environment, and
   detecting the turn rate of the head of the observer,
   presenting the video image corresponding to the first section with the lower quality if the turn rate is above a pre-determined threshold, and
   presenting the video image corresponding to the third section with the higher quality if the turn rate is below the pre-determined threshold, wherein the repeating of said detecting the orientation of the head of the observer and said presenting is done at least every 17 milliseconds.

2. The method according to claim 1, wherein a horizontal or vertical angle of view of the first or the third section is lower than 120 degrees.

3. The method according to claim 1, wherein a frame rate of the video images from said plurality of cameras is at least 25 Hertz.

4. The method according to claim 1, wherein said presenting is performed by following a movement of the head of the observer.

5. The method according to claim 1, further comprising adding virtual objects to said second video image.

6. The method according to claim 1, further comprising adding overlay information to said second video image.

7. A system for facilitating transportation of an observer in a vehicle, said system comprising:
- a plurality of cameras being arranged to provide video images, wherein said cameras are oriented in such a way that the video images show parts of the environment of the vehicle in which the observer is transported and wherein the field of views of said cameras are partly overlapping;
- an electronic control unit that combines said video images from the plurality of cameras so that the combined video images provide a first video image of a first section of the environment of the vehicle;
- a detector comprising a gyroscope and/or an optical detection unit that detects an orientation of the head of the observer;
- a presenter comprising a display and/or a projector that presents a second video image showing a second section of the environment of the vehicle to the observer, wherein said second section is a subset of said first section and wherein said second section of the environment corresponds to the detected orientation of the head of the observer,
- wherein said first section of the environment is a proper subset of the environment which can be seen by said plurality of cameras such that said the detector and the presenter are arranged to repeat said detecting and said presenting, respectively, after a predetermined time-period short enough not to cause nausea for the observer,
- the electronic control unit combines said video images from the plurality of cameras so that the combined video images provide a third video image of a third section of the environment of the vehicle,
- wherein said third section of the environment is a proper subset of the environment which can be seen by said plurality of cameras, wherein said third section of the environment is a proper subset of the first section and has a higher quality in the corresponding video image compared to the video image corresponding to the first section,
- wherein the system is arranged to detect the turn rate of the head of the observer and to present the video image of the first section with the lower quality if the turn rate is above a pre-determined threshold, to present the video image of the third section with the higher quality if the turn rate is below the pre-determined threshold, and to repeat said detecting the orientation of the head of the observer and said presenting at least every 17 milliseconds.

8. The system according to claim 7, wherein a horizontal or vertical angle of view of the first or the third section is lower than 120 degrees.

9. The system according to claim 7, wherein a frame rate of the video images from said plurality of cameras is at least 25 Hertz.

10. The system according to claim 7, wherein the presenter is arranged to follow a movement of the head of the observer.

11. The system according to claim 7, further wherein the electronic control unit adds virtual objects to said second video image.

12. The system according to claim 7, further wherein the electronic control unit adds overlay information to said second video image.

13. The system according to claim 7, further comprising a positioning system comprising one or more gyroscopes and/or a connection to a global navigation satellite system that determines the position or orientation of the vehicle.

14. The system according to claim 7, further comprising a gyroscope that determines an orientation of a turret of the vehicle.

15. A computer program for facilitating transportation of an observer in a vehicle, wherein said computer program is stored on a non-transitory computer-readable medium with program code for causing an electronic control unit or a computer connected to the electronic control unit to perform the steps according to claim 1.

16. A computer program product containing a program code stored on a non-transitory computer-readable medium for performing method steps according to claim 1, when said computer program is run on an electronic control unit or a computer connected to the electronic control unit.

17. A vehicle comprising the system according to claim 7.

* * * * *